Sept. 27, 1932. C. E. LAWSON 1,879,348
PNEUMATIC TIRE CORE
Original Filed March 15, 1930 2 Sheets-Sheet 1

Inventor

Caster E. Lawson

By Clarence A. O'Brien
Attorney

Sept. 27, 1932.    C. E. LAWSON    1,879,348
PNEUMATIC TIRE CORE
Original Filed March 15, 1930    2 Sheets-Sheet 2
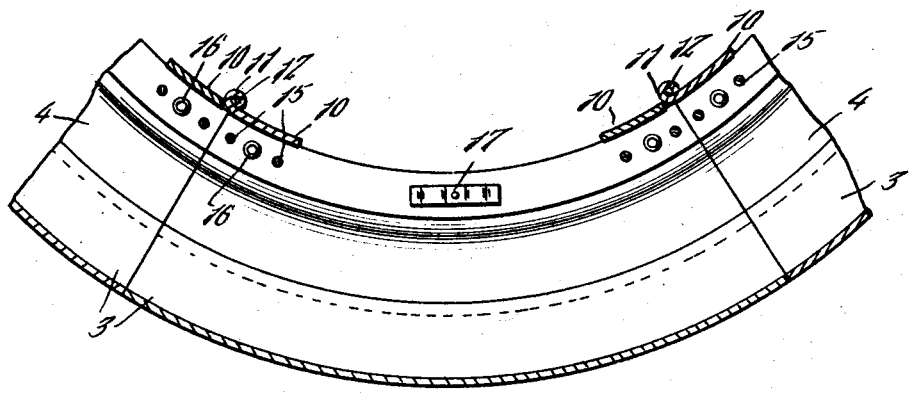
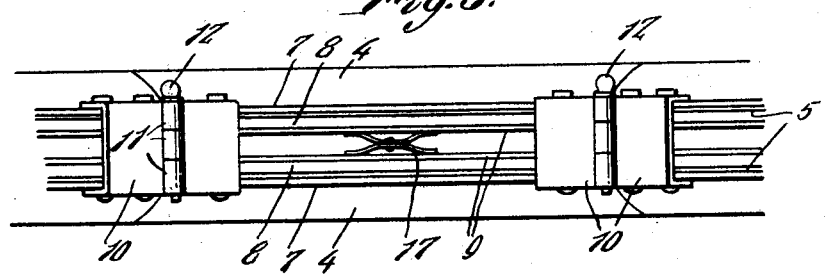
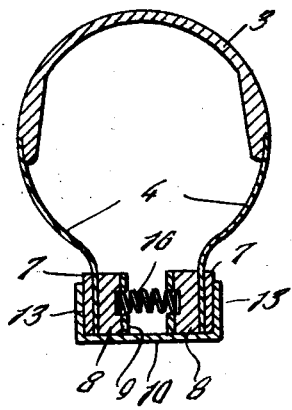
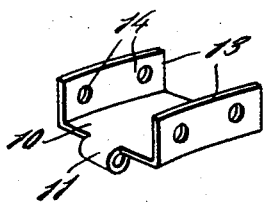
Inventor
Casper E. Lawson
By Clarence A. O'Brien
Attorney Patented Sept. 27, 1932

1,879,348

UNITED STATES PATENT OFFICE

CASTER E. LAWSON, OF UTICA, OHIO

PNEUMATIC TIRE CORE

Application filed March 15, 1930, Serial No. 436,107. Renewed December 10, 1931.

This invention relates to new and useful improvements in pneumatic tire cores of the general type illustrated in Patent No. 1,656,742, issued to me on January 17, 1928, and has for one of its objects to provide, in a manner as hereinafter set forth, a core of this character embodying a plurality of complementary sections which are hingedly connected together and removable section whereby the core may be expeditiously mounted in position for use or removed from the tire casing after the same has been molded.

Another important object of the invention is to provide a core for use in molding pneumatic tire casings which is to take the place of the somewhat unsatisfactory air bags which are in widespread use at the present for this purpose and which will exert a uniform pressure against the entire inner surface of the tire casing during the molding operation.

Another important object of the invention is to provide a pneumatic tire core of the character set forth which embodies a novel construction and arrangement whereby the use of but a single core is necessary throughout the molding process, thus facilitating the construction of the tire and materially reducing the cost of producing the same.

Further objects of the invention are to provide a pneumatic tire core which will be simple in construction, strong, durable, efficient in its use and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 2 is a fragmentary view in longitudinal section through one of the hinged sections and the end portions of the adjacent sections which are hingedly connected thereto.

Figure 3 is a fragmentary view in elevation looking at the inner side of the portions of the core illustrated in Figure 2.

Figure 4 is a cross sectional view taken substantially on the line 4—4 of Figure 1.

Figure 7 is an enlarged detail view in perspective of one of the hinge leaves through the medium of which certain of the sections are connected together.

Figure 1:
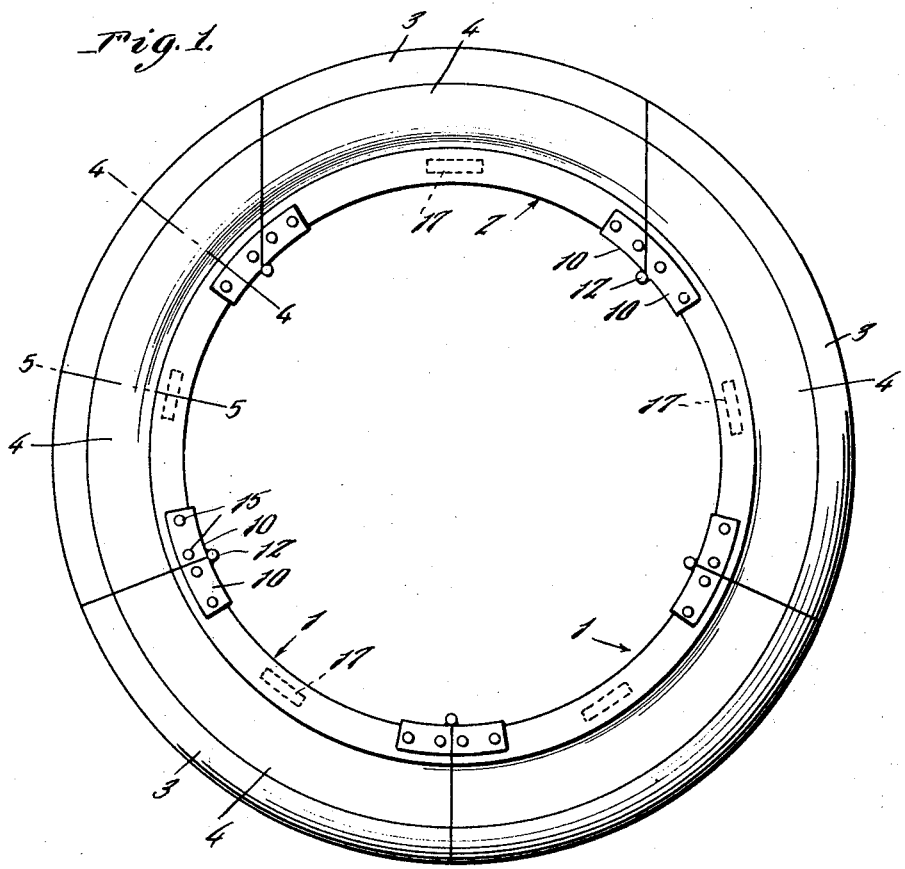
Figure 1 is a view in side elevation of a pneumatic tire core constructed in accordance with this invention, the same being shown in assembled position.

Referring to the drawings in detail, the reference character 1 designates a plurality of arcuate hingedly connected core sections and 2 designates a key or kick-out section by the removal of which the hinged sections 1 may be collapsed.

Each of the sections 1 and the section 2 comprises a rigid cap 3 of suitable metal and substantially semi-circular in cross section having recessed longitudinal marginal portions in which the upper marginal portions of the side wall sections 4 are slidably seated. As clearly seen in Figure 5 the sections 4 are curved in cross section and have formed integrally thereon the flat obtusely angled flanges 5 on the outer side of which are mounted the segments 7 of hard metal and on the inner side of which are mounted the segments 8 of relatively soft metal. Secured to the inner sides of the segments 8 are the segments 9 which are of hard metal. The side wall sections 4 are preferably formed of spring steel.

The sections 1 of the core are connected together through the medium of the hinge leaves 10 having the complementary eyes 11 thereon for the reception of the headed pintles 12. Each of the hinge leaves 10 is provided with the right angularly disposed marginal flanges 13 which extend over the outer side of the adjacent end portions of the segments 7 on the flanges 5. Each of the flanges 13 is provided with holes 14 at spaced points therein and the holes through the opposite flanges of leaf are in alignment with each other. The flanges 5 and the segments 7, 8 and 9 of the side wall sections 4 of the core are slidably mounted on the pins 15 which extend transversely through the opposite end portions thereof and said pins are mounted in the opening 14 of the flanges 13. As illustrated to advantage in Figures 2 and 4 of the drawings, the segments 8 and 9 are provided, at a point intermediate the pins 15, with opposed sockets for the reception of the opposite end of a coil spring 16 which yieldingly urge the opposite side of the core outwardly into engagement with the retaining flanges 13 of the hinge leaves 10. Leaf spring members 17 are disposed between the segments 9 at intermediate portions of each of the sections 1 and the section 2 in a manner to yieldingly urge said intermediate portions outwardly.

Figure 5:
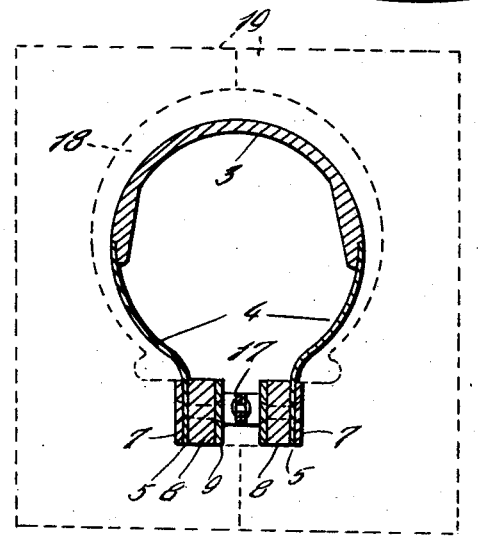
Figure 5 is a cross-sectional view taken substantially on the line 5—5 of Figure 1, and showing, in dotted lines, a tire casing and the complementary half sections of a mold mounted thereon.
Figure 6:
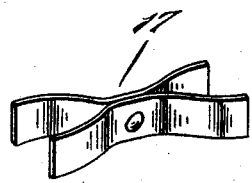
Figure 6 is an enlarged detail view in perspective showing one of the expanding elements constituting a part of this invention.

The pins which connect the key or kick-out 2 to the adjacent hinged sections 1 are removable to permit the ready removal of said kick-out section when it is desired to collapse the core. In Figure 5 of the drawings, the reference numeral 18 designates a tire casing which is being molded on the core and 19 designates the complementary half sections of the mold, the tire casing and mold section being shown in dotted lines.

It will thus be seen that I have provided a pneumatic tire core which will greatly facilitate the molding operation in building pneumatic tire casings. When removing the core from the casing, the knick-out section 2 is removed and the hinged sections 1 may then be folded inwardly and removed from the casing. The construction and arrangement of the rigid cap members 3 and the spring steel side wall sections 4, is such that when the casing 18 has been built on the contracted core and placed in the mold sections 1 for the segments 7 and flanges 5 will move the sections 4 toward each other and thus cause the caps 3 to move outwardly to compress the casing against the mold. When the mold sections are removed, the spring elements 16 and 17 spread the sections 4 and permit retraction of the caps 3. It is understood that the mold sections 19 are recessed at the proper points to receive the hinges 10.

It is believed that the many advantages of a pneumatic tire core constructed in accordance with this invention will be readiy understood, and although the preferred embodiment of the invention is as illustrated and described, it is to be understood that changes in the details of construction may be had which will fall within the scope of the invention as claimed.

What is claimed is:—

1. A pneumatic tire core of the character described comprising a plurality of hingedly connected sections and a removable section secured between certain of the hingedly connected sections in a manner to couple the same, all of said sections comprising a rigid outer peripheral cap of arcuate cross section and further including converging resilient side wall sections slidably engaged with the opposite longitudinal marginal portions of the cap and extending inwardly therefrom, and resilient means disposed between the inner portion of the side wall sections and adapted to yieldingly urge the same outwardly.

2. A pneumatic tire core of the character described comprising a plurality of connected sections, each section including a rigid cap of substantially arcuate cross section, yieldable side wall sections slidably engaged with the longitudinal marginal portions of the cap and extending inwardly therefrom in converging relation to each other, integral flanges extending inwardly from the side wall sections, hinges secured to the flanges for pivotally connecting the sections together in a manner to permit lateral movement of the side wall sections, flanges formed on the hinges adapted to limit the lateral movement of the side wall sections in an outward direction and expansible springs disposed between the side wall flanges in a manner to yieldingly urge the same outwardly.

In testimony whereof I affix my signature.

CASTER E. LAWSON.